United States Patent
Zappaterra et al.

(10) Patent No.: US 9,332,536 B1
(45) Date of Patent: May 3, 2016

(54) METHOD AND APPARATUS FOR MANAGING COMMUNICATION ON A WIRELESS CHANNEL

(71) Applicant: Sprint Spectrum L.P., Overland Park, KS (US)

(72) Inventors: Luca Zappaterra, Arlington, VA (US); Yu Zhou, Herndon, VA (US); Muhammad A. Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/698,495

(22) Filed: Apr. 28, 2015

(51) Int. Cl.
*H04W 4/00* (2009.01)
*H04W 72/04* (2009.01)
*H04W 74/08* (2009.01)
*H04L 5/00* (2006.01)

(52) U.S. Cl.
CPC ......... *H04W 72/0406* (2013.01); *H04L 5/0055* (2013.01); *H04W 72/0446* (2013.01); *H04W 74/0816* (2013.01)

(58) Field of Classification Search
None
See application file for complete search history.

(56) References Cited

U.S. PATENT DOCUMENTS

| 8,830,923 | B2 | 9/2014 | Gong et al. | |
| 2011/0286403 | A1* | 11/2011 | Jain | H04W 74/0816 370/329 |
| 2012/0320856 | A1* | 12/2012 | Kim | H04W 28/26 370/329 |
| 2012/0327870 | A1* | 12/2012 | Grandhi | H04W 28/06 370/329 |

OTHER PUBLICATIONS

Daishi Inoue et al., "A New MAC Protocol for Avoiding Needless Trnasmission Deferment Induced by Missed RTS/CTS Handshake," IEEE Computer society, 22nd International Conference on Advanced Information Networking and Applications—Workshops, pp. 977-982, 2008.
Viral Kapadia et al., "Comparative Study of Hidden Node Problem and Solution Using Different Techniques and Protocols," Journal of Computing, vol. 2, Issue 3, pp. 65-67, Mar. 2010.
Pietro Nicoletti, "IEEE 802.11 frame format," 802-11-Frame—Jun. 1, 2005.

* cited by examiner

*Primary Examiner* — Edan Orgad
*Assistant Examiner* — Rebecca Song (57) ABSTRACT

A method and apparatus to help manage communication on a wireless channel. When a neighboring node detects on a wireless channel a ready-to-send (RTS) message from a transmitting node to a receiving node, the neighboring node will set itself to avoid transmission on the channel for a time period but will then determine whether it detects in that time period a further transmission from the transmitting node to the receiving node, related to the data transmission. The further transmission may be a confirmation-to-send (CoTS) message that the transmitting node sends to the receiving node in response to a clear-to-send (CTS) from the receiving node. If the determination is affirmative, then the neighboring node will continue avoiding use of the channel. But if the determination is negative, then the neighboring node will discontinue avoiding use of the channel.

6 Claims, 6 Drawing Sheets

METHOD AND APPARATUS FOR MANAGING COMMUNICATION ON A WIRELESS CHANNEL

BACKGROUND

Unless otherwise indicated herein, the description provided in this section is not itself prior art to the claims and is not admitted to be prior art by inclusion in this section.

In a wireless communication system that implements carrier sense multiple access with collision avoidance (CSMA/CA), when a transmitting node has data to send to a receiving node on a shared wireless channel, the transmitting node will first listen to the channel for a certain interval to determine whether another node is transmitting on the channel, and the transmitting node will then transmit only if it thereby determines that the channel is idle. Once the transmitting node then transmits its data to the receiving node, the receiving node will then send an acknowledgement (ACK) message on the channel to the transmitting node.

While such a system may work well in some situations, the system can also suffer from a problem known as the "hidden node" problem. The hidden node problem arises when a neighboring node is within range of the receiving node but is not within range of the transmitting node and where the neighboring node transmits on the channel. In such a scenario, transmitting node would be unable to hear transmission from the neighboring node on the channel and may therefore conclude that the channel is idle, but the neighboring node's transmission on the channel may make it impossible for the receiving node to receive transmission from the transmitting node on the channel.

To help overcome the hidden node problem, the transmitting and receiving nodes can engage in a handshake process on the channel before the transmitting node transmits the data to the receiving node, to ensure that transmitting and receiving nodes are able to communicate with each other on the channel. In accordance with the handshake process, once the transmitting node determines that the channel is idle, the transmitting node would transmit a "ready-to-send" (RTS) message on the channel to the receiving node, to indicate that the transmitting node is ready to send data to the receiving node. If the receiving node successfully receives that RTS message from the transmitting node, the receiving node would then respond by transmitting a "clear-to-send" (CTS) message on the channel, which would indicate to the transmitting node that the transmitting node may proceed with the data transmission. In turn, if the transmitting node successfully receives the CTS message from the receiving node, the transmitting node would then proceed to transmit the data on the channel to the receiving node. And upon receipt of the data, the receiving node would then respond by transmitting an acknowledgement (ACK) message on the channel to the transmitting node.

In a system implementing such a handshake process, nodes may also be arranged to detect RTS and CTS messages on the channel and to avoid transmission on the channel for a period of time sufficient to allow the communication between transmitting and receiving nodes to complete (e.g., through ACK transmission). In practice, the avoidance time period may be referred to as a "network allocation vector" (NAV) period, and nodes may set their NAV period based on an expected duration of communication between the transmitting and receiving nodes. In particular, if a node detects an RTS message on the channel, then the node may set itself to avoid transmission on the channel for an RTS NAV that sufficient to allow for transmission of the corresponding expected CTS message, data, and ACK message. Likewise, if a node detects a CTS message on the channel, then the node may set itself to avoid transmission on the channel for a CTS NAV that is sufficient to allow for transmission of the corresponding expected data and ACK message.

OVERVIEW

With such an RTS/CTS/data/ACK process, however, a further problem can arise. Namely, when the transmitting node transmits an RTS message to the receiving node and a neighboring node detects that RTS message on the channel, the neighboring node would responsively avoid transmission on the channel for the RTS NAV period. However, there is a chance in that scenario that the receiving node would not receive the RTS message from the transmitting node (e.g., if there is sufficient interference on the channel in range of the receiving node, or if the receiving node is itself already busy using the channel). If that happens, then the receiving node would not send a CTS message for the data transmission, and so the transmitting node may conclude that data transmission to the receiving node is currently not feasible (and the transmitting node may wait some time before retrying). But the neighboring node in that scenario would continue to avoid transmission on the channel for the full RTS NAV period, as the neighboring node would be unaware that the transmitting node did not receive a CTS message from the receiving node. Unfortunately, this may therefore unnecessarily preclude the neighboring node from making good use of the channel for the remainder of the RTS NAV period.

One solution to this further problem may be for the neighboring node to monitor the channel for a CTS message corresponding with the RTS message and, if the neighboring node does not detect such a CTS messages on the channel, then for the neighboring node to discontinue its avoiding transmission on the channel for the remainder of the RTS NAV period. Thus, if the receiving node does not transmit a CTS message in response to the RTS message, then the neighboring node can freely transmit on the channel rather than continuing to avoid transmitting on the channel for the remainder of the RTS NAV period.

However, an issue with this solution is that the neighboring node may itself be out of range of the receiving node and may therefore be unable to receive a CTS message transmitted by the receiving node. Consequently, even if the receiving node transmits a CTS message, the neighboring node may not detect that CTS message, and so the neighboring node may discontinue avoiding transmission on the channel. As a result, the neighboring node may then transmit on the channel, which may interfere with the transmitting node's use of the channel. Therefore, a further improvement is desired.

Disclosed herein is a method and apparatus to better manage communication on a wireless channel. In accordance with the disclosure, when a neighboring node detects on the channel an RTS message from a transmitting node to a receiving node, the neighboring node will set itself to avoid transmission on the channel for a time period but will then determine whether it detects in that time period a further transmission from the transmitting node to the receiving node, related to the data transmission. If the determination is affirmative, then the neighboring node will continue avoiding use of the channel. But if the determination is negative, then the neighboring node will discontinue avoiding use of the channel.

In this arrangement, the further transmission from the transmitting node to the receiving node can be the data transmission from the transmitting node to the receiving node, for which the transmitting node sent the RTS in the first place.

Thus, once the neighboring node detects the RTS message from the transmitting node to the receiving node and responsively begins avoiding transmission on the channel, the neighboring node may then monitor the channel for the associated data transmission from the transmitting node to the receiving node. If the neighboring node detects the data transmission from the transmitting node to the receiving node, then the neighboring node may responsively continue avoiding transmission on the channel for a period of time sufficient to allow for transmission of an ACK message from the receiving node to the transmitting node. Whereas, if the neighboring node does not detect the data transmission from the transmitting node to the receiving node, then the neighboring node may responsively discontinue avoiding transmission on the channel rather than continuing to avoid transmission on the channel for the period of time sufficient to allow for transmission of the ACK message.

Alternatively or additionally, the further transmission from the transmitting node to the receiving node can be transmission of a newly defined "confirmation-to-send" (CoTS) control message from the receiving node. In this arrangement, the transmitting node may be configured to respond to receipt on the channel of a CTS message from the receiving node by transmitting a CoTS message on the channel to the receiving node, to indicate that the transmitting node is going to transmit the data to the receiving node and essentially to confirm receipt of the CTS message from the receiving node. In that case, the further transmission from the transmitting node to the receiving node can be the CoTS message transmission from the transmitting node to the receiving node.

Thus, once the neighboring node detects the RTS message from the transmitting node to the receiving node and responsively begins avoiding transmission on the channel for the RTS NAV period, the neighboring node may then monitor the channel for the associated CoTS message transmission from the transmitting node to the receiving node. If the neighboring node detects the CoTS message transmission from the transmitting node to the receiving node, then the neighboring node may responsively continue avoiding transmission on the channel for a remainder of the RTS NAV period, i.e., for a period of time sufficient to allow for transmission of the data from the transmitting node to the receiving node and transmission of an ACK message from the receiving node to the transmitting node. Whereas, if the neighboring node does not detect the CoTS message transmission from the transmitting node to the receiving node, then the neighboring node may responsively discontinue avoiding transmission on the channel for the remainder of the RTS NAV period rather than continuing to avoid transmission on the channel for the remainder of the RTS NAV period.

Accordingly, in one respect, disclosed herein is a method of managing communication on a wireless channel. According to the method, a first wireless communication device (WCD) detects on the wireless channel an RTS message from a second WCD to a third WCD, the RTS message indicating that the second WCD is ready to send data to the third WCD. In response to detecting on the wireless channel the RTS message from the second WCD to the third WCD, the first WCD then configures itself to avoid transmission on the wireless channel for a first predefined period. The first WCD then makes a determination of whether the first WCD detects during the first predefined period on the wireless channel a further transmission from the second WCD to the third WCD related to transmission of the data (e.g., the further transmission being the data transmission associated with the detected RTS or perhaps being a CoTS message preceding that associated data transmission). And if the determination is affirmative, then the first WCD continues to avoid transmission on the wireless channel for a second predefined period, but, if the determination is negative, then the first WCD discontinues the avoiding of transmission on the wireless channel without the avoiding of transmission for the second predefined period.

Further, in another respect, disclosed is another method of managing communication on a wireless channel. In accordance with the method, a first device detects on the wireless channel an RTS message from a second device to a third device, the RTS message indicating that the second device is ready to send data to the third device. In response to the detecting on the wireless channel the RTS message from the second device to the third device, the first device then configures itself to avoid transmission on the wireless channel for a predefined avoidance period sufficient to allow use of the wireless channel for a sequence of transmissions associated with the RTS message including (i) transmission of a CTS message from the third device to the second device responsive to the RTS message, (ii) transmission of the data from the second device to the third device responsive to the CTS message, and (iii) transmission of an ACK message from the third device to the second device confirming receipt of the data. During the predefined avoidance period, the first device then detects an absence of an expected transmission (e.g., an absence of transmission of the data or an absence of transmission of an associated CoTS message) on the wireless channel from the second device to the third device. And responsive to detecting the absence of the expected transmission on the wireless channel from the second device to the third device, the first device reconfigures itself to discontinue the avoiding of transmission on the wireless channel rather than continuing to avoid transmission on the wireless channel for a remainder of the predefined avoidance period.

Still further, disclosed is a device having a wireless communication interface for transmitting and receiving on a wireless channel, the device being configured to carry out operations to manage communication on the wireless channel. In accordance with the disclosure, for instance, the device is configured to detect on the wireless channel an RTS message from a transmitter to a receiver, where the RTS message indicates that the transmitter is ready to send data to the receiver, and where the transmitter and receiver are separate from the device (i.e., are separate devices rather than being part of the device at issue). Further, the device is configured to respond to detecting on the wireless channel the RTS message from the transmitter to the receiver, by (i) starting to avoid transmission on the wireless channel for a first avoidance period, (ii) making a determination of whether, within the first avoidance period, there is a further transmission (e.g., the data transmission associated with the RTS message or a CoTS message transmission associated with the RTS message) from the transmitter to the receiver on the wireless channel, (iii) if the determination is affirmative, then continuing to avoid transmission on the wireless channel for a second avoidance period, but (iv) if the determination is negative, then discontinuing the avoiding of transmission on the wireless channel rather than continuing to avoid transmission on the wireless channel for the second avoidance period.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described by way of example in the context of IEEE 802.11 (WiFi) communications. However, it should be understood that the principles described could be applied as well in numerous other contexts, not limited to the specifics described.

The 802.11 standards provide for centralized and peer-to-peer communication between WCDs such as computers, cell phones, appliances, access points, small cells, and other wirelessly-equipped devices, over shared wireless channels. Each such WCD will have a MAC address that uniquely identifies the WCD as compared with other WCDs, and communications between WCDs may include headers that carry source and destination MAC addresses, with the source MAC address being the MAC address of the WCD from which the communication is being sent and the destination MAC address being the MAC address of the WCD to which the communication is being sent.

Historically, 802.11 has operated on discrete 20 MHz wide wireless channels, with communication between a pair of WCDs occurring on a single such channel. In basic practice, a transmitting WCD that seeks to transmit data to a receiving WCD would first listen to the channel for a defined time interval known as a DIFS (Distributed coordination function (DCF) interframe space) duration. If the transmitting WCD does not hear any transmissions on the channel for the DIFS duration, then the transmitting WCD would deem the channel to be idle and would responsively commence communication with the receiving WCD on the channel, possibly making use of the basic RTS/CTS/data/ACK process described above.

To provide increased data throughput, a recent version of 802.11 called "802.11ac" now also allows a pair of WCDs to communicate with each other on an aggregate of multiple 20 MHz channels at once. With such an arrangement, a transmitting WCD may evaluate multiple such channels to determine if they are idle in the manner described above, and the transmitting WCD may be configured (i) to commence communication with the receiving WCD concurrently on all of those channels, only if the transmitting WCD deems all of the channels to be idle, or (ii) to commence communication with the receiving WCD concurrently on just the contiguous channels that the WCD deems to be idle. Further, under 802.11ac, the transmitting WCD and receiving WCD would also engage in the RTS/CTS/data/ACK process respectively on each channel that the transmitting WCD selects for use.

Each WCD engaged in 802.11 communication will have an effective range of transmission, defined by the WCD's antenna structure, transmission power, and frequency of operation (with lower frequencies typically having less propagation loss and thus wider range). The range of transmission of one WCD could thus be the same as or different than the range of transmission of another WCD.

Figure 1:
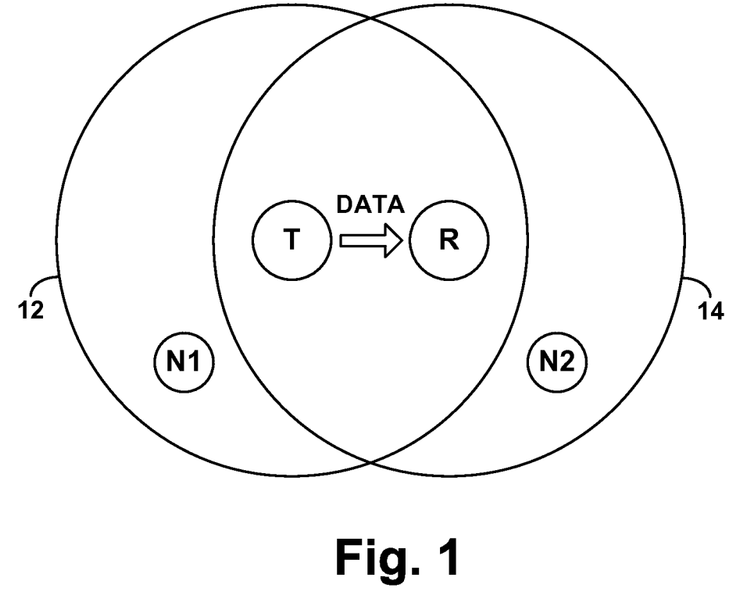
FIG. 1 is a depiction of a scenario in which a transmitting WCD seeks to transmit data to a receiving WCD.

FIG. 1 depicts an example arrangement in which a transmitting WCD, "T", seeks to transmit data (e.g., bearer data, initiated at an application layer or the like) to a receiving WCD, "R", on a representative 802.11 channel, and where neighboring WCDs, "N1" and "N2", are positioned in the vicinity. As shown in FIG. 1, the transmitting WCD has a respective range of transmission 12 and the receiving WCD has a respective range of transmission 14. The receiving WCD is shown within the transmitting WCD's range of transmission, so that the receiving WCD may receive transmissions from the transmitting WCD. Likewise, the transmitting WCD is shown within the receiving WCD's range of transmission, so that the transmitting WCD may receive transmissions from the receiving WCD. Further, the neighboring WCD N1 is shown within the transmitting WCD's range of transmission but outside the receiving WCD's range of transmission, so that the neighboring WCD N1 may receive transmissions from the transmitting WCD but may not receive transmissions from the receiving WCD. And the other neighboring WCD N2 is shown within the receiving WCD's range of transmission but outside the transmitting WCD's range of transmission, so that the neighboring WCD N2 may receive transmissions from the receiving WCD but may not receive transmissions from the transmitting WCD.

Figure 2:
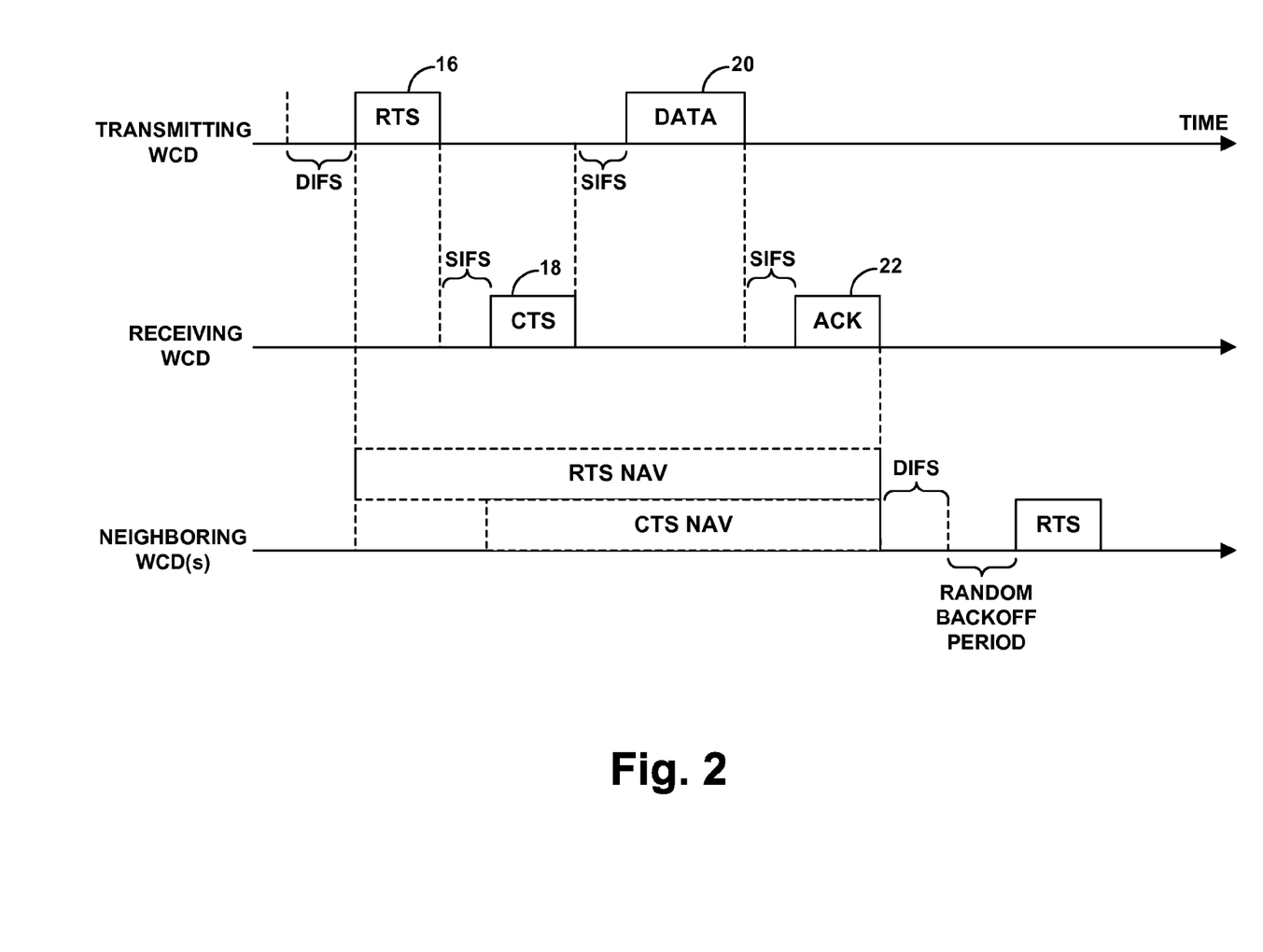
FIG. 2 is a depiction of an example RTS/CTS/data/ACK process.

FIG. 2 next depicts an example RTS/CTS/data/ACK process with this arrangement, on a representative 802.11 channel, although it should be understood that under 802.11ac or the like, the WCDs may engage in a similar process concurrently on multiple channels that the transmitting WCD deems to be idle.

As shown in FIG. 2, the transmitting WCD first monitors the channel for the DIFS duration to determine that the channel is idle. Upon thereby deeming the channel to be idle, the transmitting WCD then transmits to the receiving WCD an RTS message 16 as an indication that the transmitting WD has data to transmit to the receiving WCD. The RTS message may carry source and destination MAC addresses and a value indicating that the message is an RTS message, among possibly other information such as a transmission timestamp for instance. Further, a predefined segment of time may be provided for this RTS message transmission.

Assuming the receiving WCD successfully receives the RTS message from the transmitting WCD, the receiving WCD would thus become aware that the transmitting WCD has data to send to the receiving WCD. As further shown, the receiving WCD then responsively waits a predefined time interval known as an SIFS (short interframe space) duration and then transmits on the channel a CTS message 18 as an indication of readiness to receive and thus that the transmitting WCD is clear to send. The CTS message may carry a destination MAC address (of the transmitting WCD) and a value (e.g., a control message sub-type value) indicating that the message is a CTS message, among possibly other information such as a transmission timestamp for instance. Further, a predefined segment of time may be provided for this CTS message transmission.

Assuming the transmitting WCD successfully receives the CTS message from the receiving WCD, the transmitting WCD would thus become aware that the transmitting WCD is clear to transmit to the receiving WCD. The transmitting WCD would then responsively wait another SIFS duration and would then transmit the data 20 to the receiving WCD. The data transmission may carry source and destination MAC addresses and a value (e.g., another control message sub-type value) indicating that the transmission is a data transmission and may then of course carry the data (e.g., bearer data), among possibly other information. A representative implementation assumes that the data transmission is of a predefined duration or extent, which may accommodate just a portion of data buffered by the transmitting WCD for transmission to the receiving WCD. Alternatively, implementations could provide for adaptive data transmission size, possibly having the RTS message specify the data duration and the CTS message confirm the data duration.

Assuming the receiving WCD successfully receives the data transmission from the transmitting WCD, the receiving WCD would then wait another SIFS duration and then respond to the successful receipt of the data transmission by transmitting to the transmitting WCD an ACK message 22 to acknowledge receipt of the data. Similar to the CTS transmission discussed above, the ACK message may carry a destination MAC addresses and a value indicating that the message is an ACK message, among possibly other information such as a transmission timestamp for instance. Further, a predefined segment of time may be provided for this ACK message transmission.

As noted above, a neighboring WCD may be arranged to detect transmissions on the channel and responsively forgo use of (transmission on) the channel for a NAV period sufficient to allow for completion of the associated communication. A neighboring WCD may do this when the neighboring node itself seeks to transmit data on the channel and thus monitors the channel for a DIFS duration as noted above. If the neighboring WCD thereby detects that the channel is not idle, then the neighboring WCD may set an appropriate NAV timer and then avoid use of the channel for the duration of that NAV timer. Upon expiration of the NAV timer, the neighboring node may then monitor the channel for a new DIFS duration, possibly plus a random backoff period, and if the channel is idle may then send its own RTS message.

By way of example, if neighboring WCD N1 detects the RTS message transmission from the transmitting WCD to the receiving WCD (noting from content of the transmission that the transmission is an RTS message transmission), then neighboring WCD N1 may responsively set and apply an RTS NAV timer for a duration spanning the RTS message, the first SIFS, the CTS message, the second SIFS, the data transmission, the third SIFS, and the ACK. Thus, neighboring WCD N1 would configure itself to forgo use of the channel for that full RTS NAV period, to allow the remainder of the communication exchange between the transmitting WCD and the receiving WCD to be fully carried out.

As another example, if neighboring WCD N2 detects the CTS message transmission from the receiving WCD (noting from content of the transmission that the transmission is a CTS message transmission), then neighboring WCD N2 may responsively set and apply a CTS NAV timer for a duration spanning the CTS message, the second SIFS, the data transmission, the third SIFS, and the ACK. Thus, neighboring WCD N2 would configure itself to forgo use of the channel for that full CTS NAV period, to allow the remainder of the communication exchange between the transmitting WCD and the receiving WCD to be fully carried out As discussed above, a problem with this arrangement is that, if the transmitting WCD sends an RTS message to the receiving WCD and a neighboring WCD (e.g., N1) detects that RTS transmission and responsively enters into a mode of avoiding use of the channel for the full RTS NAV, but if the transmitting WCD does not receive a CTS message from the receiving WCD, the neighboring WCD would then be unnecessarily avoiding use of the channel for the remainder of the RTS NAV. This is an inefficient result. Further, in a multiple-channel scenario such as with 802.11ac, this can be especially inefficient, as the unnecessary avoidance may extend to multiple channels at once.

As noted above, one way to help solve this problem is to make use of a message referred to herein as a confirmation-to-send ("CoTS") message. As presently contemplated, a transmitting WCD would be configured to transmit a CoTS message to the receiving WCD in response to receipt from the receiving WCD of a CTS message, to confirm that the transmitting WCD is going to transmit to the receiving WCD (and thus to effectively confirm that the transmitting WCD received a CTS message from the receiving WCD). The transmitting WCD may be configured to send a CoTS message to the receiving WCD after a SIFS duration following the CTS message duration, and perhaps to then wait another configured duration (perhaps shorter than the SIFS) before sending the data to the receiving WCD. Further, the CoTS message may carry a source MAC addresses and a value (e.g., a newly defined sub-type value) indicating that the message is a CoTS message. A neighboring WCD that has detected an RTS message from the transmitting WCD to the receiving WCD and that has responsively started avoiding use of the channel for the RTS NAV avoidance period may continue avoiding use of the channel for a remainder of the RTS NAV period on the condition that the neighboring WCD detects the associated CoTS message from the transmitting WCD.

With this arrangement, the neighboring WCD that detected the RTS message transmission from the transmitting WCD to the receiving WCD would expect to then also detect the associated CoTS message from the transmitting WCD in the timeframe allowing for the RTS message, the first SIFS, the CTS message, the second SIFS, and the CoTS message. Thus, if the neighboring WCD does not detect that associated CoTS message from the transmitting WCD, then the neighboring WCD may rightly conclude that the channel will not be used as planned, and so the neighboring WCD may responsively discontinue its avoiding use of the channel for the remainder of the RTS NAV period (and may thus proceed with possible transmission itself on the channel, without waiting for expiration of the RTS NAV period). Whereas, if the neighboring WCD does detect the associated CoTS message from the transmitting WCD, then the neighboring WCD may rightly conclude that the channel will continue to be used as understood, and so the neighboring WCD may responsively continue its avoiding use of the channel for the remainder of the RTS NAV period.

Phrased another way, the neighboring WCD may respond to the RTS message by setting and applying a first NAV extending through the time when the neighboring WCD would expect to detect the associated CoTS message, and (i) if the neighboring WCD detects the associated CoTS message, then the neighboring WCD may set and apply another NAV that extends through the expected, associated ACK message transmission, but (ii) if the neighboring WCD does not detect the associated CoTS message, then the neighboring WCD may discontinue avoiding use of the channel by not setting and applying the other NAV extending through the ACK message transmission.

Figure 3:
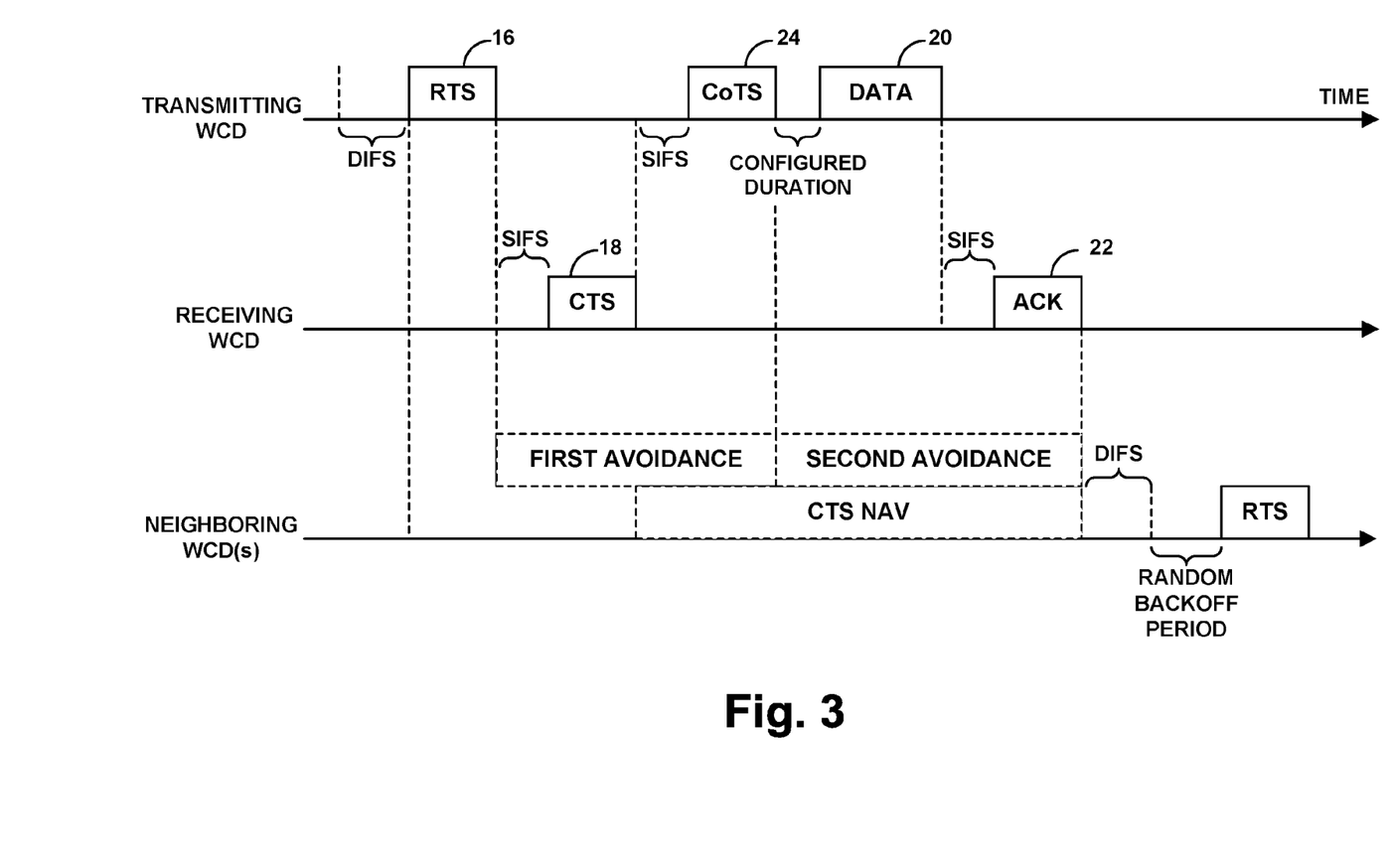
FIG. 3 is a depiction of an example RTS/CTS/CoTS/data/ACK process.

FIG. 3 depicts this arrangement. As shown in FIG. 3, the RTS message, first SIFS, CTS message, and second SIFS are the same as discussed above with respect to FIG. 2. Following the second SIFS, the transmitting WCD then transmits a CoTS message 24 to the receiving WCD. After a possible further SIFS duration, the transmitting WCD then proceeds with the data transmission 20, and after another SIFS, the receiving WCD responds with an ACK message as discussed above. As further shown, in this arrangement, a neighboring WCD such as neighboring WCD N1 may begin avoiding transmission on the channel for a first avoidance period that includes, in sequence beginning at an end of the RTS message, (i) a first interframe interval, (ii) a CTS interval, (iii) a second interframe interval, and (iv) a CoTS interval Likewise, a CTS NAV that a neighboring WCD such as neighboring WCD N2 may set may similarly encompass the CoTS interval.

With this arrangement as shown, after neighboring WCD N1 begins avoiding transmission on the channel for first avoidance period, neighboring WCD N1 may then determine whether neighboring WCD N1 detects the expected CoTS message associated with the exchange between the transmitting WCD and the receiving WCD. If so, then neighboring WCD N1 may responsively continue avoiding use of the channel for a second avoidance period that includes, in sequence beginning at an end of the first avoidance period, (i) a third interframe interval, (ii) a data transmission interval, (iii) a fourth interframe interval, and (iv) an ACK interval. But if not, then neighboring WCD N1 may responsively discontinue its avoiding use of the channel early rather than continuing to avoid use of the channel for that second avoidance period.

As a variation on this process, a similar result can also be achieved by having the neighboring WCD monitor for the data transmission 20 from the transmitting WCD to the receiving WCD, possibly excluding the CoTS feature. In this variation, referring back to FIG. 2, once neighboring WCD N1 sets and begins to apply the RTS NAV, neighboring WCD N1 may then expect to also detect the associated data transmission 20 from the transmitting WCD to the receiving WCD at the expected time. If neighboring WCD N1 detects that data transmission, then neighboring WCD N1 may responsively continue avoiding use of the channel for the remainder of the RTS NAV (e.g., for the remaining period encompassing any remainder of the data transmission time, the next SIFS, and the ACK transmission time). Whereas, if neighboring WCD N1 does not detect that data transmission, then neighboring WCD N1 may responsively discontinue its avoiding use of the channel early rather than continuing to avoid use of the channel for that remainder of the RTS NAV period.

Further, other variations are possible as well. For instance, more generally, once the a first WCD sets and begins to apply an NAV in view of detected transmission from a second WCD to a third WCD, the first WCD may then condition its continued avoiding of transmission on detecting an expected further transmission from the second WCD to the third WCD.

Note also that the CoTS message feature discussed above can be used for additional purposes as well. For instance, in a multi-channel arrangement such as under 802.11ac, the transmitting WCD may include in its CoTS message a list of the channels on which the transmitting WCD is communicating with the receiving WCD (such as a list of the channels on which the WCD has successfully received a CTS message from the receiving WCD) for the data transmission at issue, thus providing notice of transmission on those listed channels. That way, if interference prevents the receiving WCD from receiving the CoTS message that the transmitting WCD sends on one of the multiple channels, the receiving WCD may still learn of the CoTS for that channel by receiving on another one of the channels a CoTS listing the multiple channels. Further, a neighboring WCD that newly arrives into transmission range 12 of the transmitting WCD (e.g., after the RTS message transmission) and detects the CoTS message on any of the channels can readily determine which channels the transmitting WCD and receiving WCD will be using, and so the neighboring WCD may responsively avoid use of all of those listed channels for a period that encompasses the data transmission, SIFS, and ACK transmission for instance.

Figure 4:
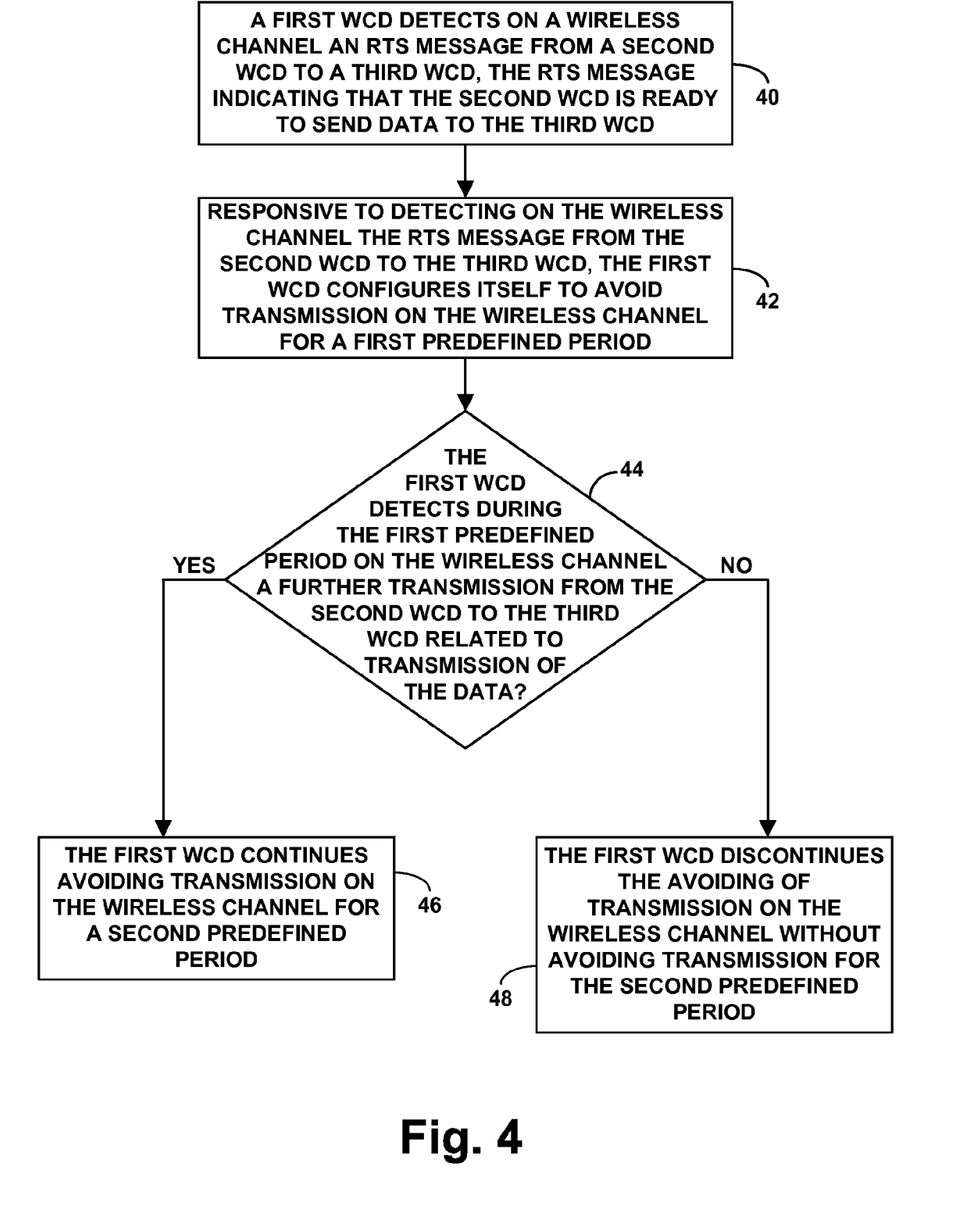
FIG. 4 is a flow chart depicting features of an example method.

FIG. 4 is next a flow chart depicting operations that can be carried out in accordance with an example implementation of this disclosure, to manage communication on a wireless channel (such as on an individual 802.11 channel, and perhaps on each of multiple channels being used in an 802.11ac arrangement). As shown in FIG. 4, at block 40, a first WCD detects on the wireless channel an RTS message from a second WCD to a third WCD, the RTS message indicating that the second WCD is ready to send data to the third WCD. At block 42, responsive to detecting on the wireless channel the RTS message from the second WCD to the third WCD, the first WCD configures itself to avoid transmission on the wireless channel for a first predefined period. At block 44, the first WCD then makes a determination of whether the first WCD detects during the first predefined period on the wireless channel a further transmission from the second WCD to the third WCD related to transmission of the data. If the determination is affirmative, then, at block 46, the first WCD continues avoiding transmission on the wireless channel for a second predefined period. But if the determination is negative, then, at block 48, the first WCD discontinues the avoiding of transmission on the wireless channel without avoiding transmission for the second predefined period.

In this method, in line with the discussion above, the first predefined time period may include, in sequence beginning at an end of the RTS message, a first interframe interval followed by a CTS interval and a configured interval followed by at least some delta portion of the data transmission interval (with the delta being sufficient time to identify data transmission). In that case, the further transmission from the second WCD to the third WCD may be transmission of the data in the data transmission interval, and the second predefined period may include, in sequence after the first predefined period, any remainder of the data transmission interval, another interframe interval, and an ACK interval. Variations on this timing are possible in view of the discussion above.

Alternatively, the first predefined time period may include, in sequence beginning at an end of the RTS message, a first interframe interval followed by a CTS interval and a second interframe interval followed by a CoTS interval. In that case, the further transmission from the second WCD to the third WCD may be transmission of a CoTS message in the CoTS interval confirming that the second WCD received a CTS message from the third WCD and is going to send the data to the third WCD, and the second predefined period may include, in sequence beginning at an end of the first predefined period, a configured interval followed by a data transmission interval and another interframe interval followed by an ACK interval. Variations on this timing are possible in view of the discussion above as well.

Also in line with the discussion above, the RTS message in this method may carry source and destination MAC addresses corresponding respectively with the second WCD and third WCD, and the further transmission from the second WCD to the third WCD would then also carry the source and destination MAC addresses corresponding respectively with the second WCD and third WCD, to facilitate determination by the first WCD that the further transmission relates to the RTS transmission (and thus, in view of the timing, to the data transmission).

In addition, per the discussion above, the act of the first WCD configuring itself to avoid transmission on the wireless channel for the first predefined period may involve the first WCD activating a first timer (e.g., a first NAV timer) that defines the first predefined period, and the first WCD avoiding transmission on the wireless channel while the first timer runs, and the act of the WCD continuing to avoid transmission on the wireless channel for the second predefined period may involve the first WCD activating a second timer (e.g., a second NAV timer) defining the second predefined period and the first WCD avoiding transmission on the wireless channel while the second timer runs.

Figure 5:
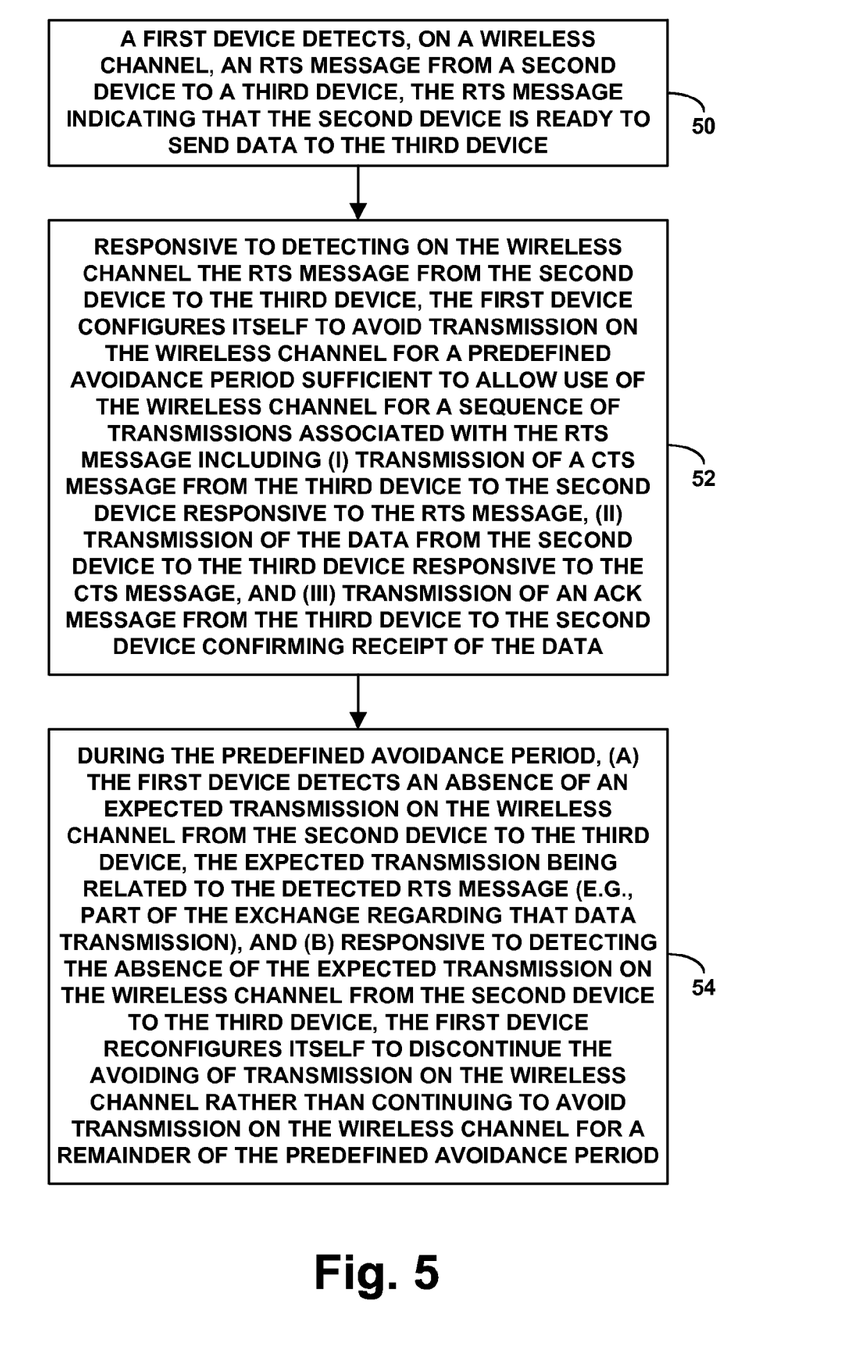
FIG. 5 is another flow chart depicting features of an example method.

FIG. 5 is next another flow chart depicting operations that can be carried out in accordance with this disclosure to manage communication on a wireless channel. As shown in FIG. 5, at block 50, a first device detects, on the wireless channel, an RTS message from a second device to a third device, the RTS message indicating that the second device is ready to send data to the third device. At block 52, responsive to detecting on the wireless channel the RTS message from the second device to the third device, the first device configures itself to avoid transmission on the wireless channel for a predefined avoidance period sufficient to allow use of the wireless channel for a sequence of transmissions associated with the RTS message including (i) transmission of a CTS message from the third device to the second device responsive to the RTS message, (ii) transmission of the data from the second device to the third device responsive to the CTS message, and (iii) transmission of an ACK message from the third device to the second device confirming receipt of the data.

Further, at block 54, during the predefined avoidance period, (a) the first device detects an absence of an expected transmission on the wireless channel from the second device to the third device, the expected transmission being related to the detected RTS message (e.g., part of the exchange regarding that data transmission), and (b) responsive to detecting the absence of the expected transmission on the wireless channel from the second device to the third device, the first device reconfigures itself to discontinue the avoiding of transmission on the wireless channel rather than continuing to avoid transmission on the wireless channel for a remainder of the predefined avoidance period.

Here again, the expected transmission on the wireless channel may be the transmission of the data from the second device to the third device, and the predefined avoidance period may include a data transmission interval, in which case detecting absence of transmission of the data may involve detecting absence of transmission of the data in the data transmission interval. Alternatively or additionally, the sequence of transmissions may also include a transmission from the second device to the third device of a CoTS message responsive to the CTS message, before transmission of the data from the second device to the third device, in which case the expected transmission on the wireless channel may be transmission of the CoTS message from the second device to the third device. In this regard, again the predefined avoidance period may include a CoTS transmission interval, in which case detecting absence of transmission of the CoTS may involve detecting absence of transmission of the CoTS message in the CoTS transmission interval.

Further, the predefined avoidance period may include a first interframe interval preceding transmission of the CTS message, a second interframe interval preceding transmission of the data, and a third interframe interval preceding transmission of the ACK message. And still further, various features described above with respect to the flow chart of FIG. 4 can apply here, and vice versa.

Figure 6:
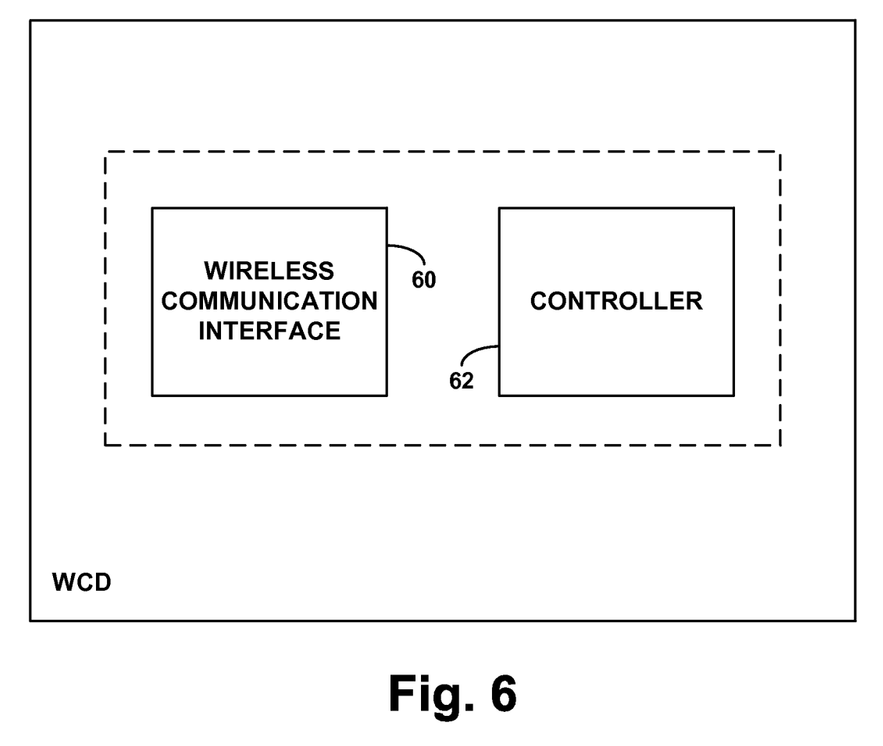
FIG. 6 is a simplified block diagram of an example WCD operable in accordance with the disclosure.

Finally, FIG. 6 is a simplified block diagram of an example WCD, showing some of the components that can be included in such a device to facilitate carrying out features such as those discussed above. This WCD could be configured to engage in 802.11 communications in line with the discussion above, and may thus at times function as a transmitting WCD, at other times function as a receiving WCD, and at other times function as a neighboring WCD.

As shown in FIG. 6, the example WCD includes a wireless communication interface 60 and a controller 62, which may be integrated together (e.g., on a common chipset) or otherwise communicatively linked together by a system bus or other connection mechanism. In practice, the wireless communication interface 60 may comprise an 802.11 (or other) radio and antenna structure, configured to transmit and receive on one or more designated channels, such as 20 MHz 802.11 wireless channels for instance, and thus to detect communications on such a channel, such as communications indicating by their MAC addresses that they are from one particular device to another and indicating by other contained information what type of communications they are. The controller 62 may take various forms (such as one or more processing units (e.g., microprocessors), non-transitory data storage, and program instructions executable by the processing unit(s)), configured to carry out (e.g., to cause the WCD to carry out) various operations such as those discussed above.

For example, the operations may include detecting, on the wireless channel, an RTS message from a transmitter to a receiver (the transmitter and receiver being other devices, not the device at issue), where the RTS message indicates that the transmitter is ready to send data to the receiver. Further, the operations may include, in response to detecting the RTS message from the transmitter to the receiver, (i) to starting to avoid transmission on the wireless channel for a first avoidance period and (ii) making a determination of whether, within the first avoidance period, there is a further transmission from the transmitter to the receiver on the wireless channel, where the further transmission is related to transmission of the data, (iii) if the determination is affirmative, then continuing to avoid transmission on the wireless channel for a second avoidance period, but (iv) if the determination is negative, then discontinuing the avoiding of transmission on the wireless channel rather than continuing to avoid transmission on the wireless channel for the second avoidance period.

In addition, the operations may also include operations that are specific to a transmitter or receiver. For instance, if we consider the RTS message to be a first RTS message and the data to be first data, the operations may further include, when the device has second data to transmit to a recipient device on the wireless channel, (a) verifying absence of communication on the wireless channel for a first interframe interval, (b) upon expiration of the first interframe interval, transmitting on the wireless channel to the recipient device a second RTS message for the second data to be transmitted, (c) after transmitting the second RTS message, receiving on the wireless channel from the recipient device a CTS message corresponding with the second RTS message, and (d) responsive to receiving from the recipient device the CTS message, transmitting on the wireless channel a CoTS message before then transmitting to the recipient device on the wireless channel the second data.

Exemplary embodiments have been described above. Those skilled in the art will understand, however, that changes and modifications may be made to these embodiments without departing from the true scope and spirit of the invention.

We claim:

1. A method of managing communication on a wireless channel comprising:
   a first wireless communication device (WCD) detecting, on the wireless channel, a ready-to-send (RTS) message from a second WCD to a third WCD, the RTS message indicating that the second WCD is ready to send data to the third WCD;

responsive to detecting on the wireless channel the RTS message from the second WCD to the third WCD, the first WCD configuring itself to avoid transmission on the wireless channel for a first predefined period, wherein the first predefined time period includes, in sequence beginning at an end of the RTS message, (i) a first interframe interval, (ii) a clear-to-send (CTS) interval, (iii) a second interframe interval, and (iv) a confirmation-to-send (CoTS) interval;

the first WCD making a determination of whether the first WCD detects during the first predefined period on the wireless channel a further transmission from the second WCD to the third WCD related to transmission of the data wherein the further transmission from the second WCD to the third WCD is transmission of a CoTS message in the CoTS interval confirming that the second WCD received a CTS message from the third WCD and is going to send the data to the third WCD and carrying a list of wireless channels on which the second WCD will be transmitting to the third WCD; and if the determination is affirmative, then the first WCD continuing to avoid transmission on the wireless channel for a second predefined period, but, if the determination is negative, then the first WCD discontinuing the avoiding of transmission on the wireless channel without the avoiding of transmission for the second predefined period, wherein the second predefined period includes, in sequence beginning at an end of the first predefined period, (i) a third interframe interval, (ii) a data transmission interval, (iii) a fourth interframe interval, and (iv) an ACK interval.

2. The method of claim 1, wherein the RTS message carries source and destination Media Access Control (MAC) addresses corresponding respectively with the second WCD and third WCD.

3. The method of claim 1, wherein the first WCD configuring itself to avoid transmission on the wireless channel for the first predefined period comprises the first WCD activating a first timer defining the first predefined period, and the first WCD avoiding transmission on the wireless channel while the first timer runs, and
wherein the first WCD continuing to avoid transmission on the wireless channel for the second predefined period comprises the first WCD activating a second timer defining the second predefined period and the first WCD avoiding transmission on the wireless channel while the second timer runs.

4. The method of claim 3, wherein the first timer comprises a first network allocation vector (NAV) timer and the second timer comprises a second NAV timer.

5. A device comprising:
a wireless communication interface for transmitting and receiving on a wireless channel;
a controller comprising one or more processing units for causing the device to carry out operations, the operations comprising (a) detecting, on the wireless channel, a ready-to-send (RTS) message from a transmitter to a receiver, wherein the RTS message indicates that the transmitter is ready to send data to the receiver, and wherein the transmitter and receiver are separate from the device, and (b) responsive to detecting on the wireless channel the RTS message from the transmitter to the receiver,
(i) starting to avoid transmission on the wireless channel for a first avoidance period, wherein the first avoidance period includes, in sequence beginning at an end of the RTS message, (a) a first interframe interval, (b) a clear-to-send (CTS) interval, (c) a second interframe interval, and (d) a confirmation-to-send (CoTS) interval,
(ii) making a determination of whether, within the first avoidance period, there is a further transmission from the transmitter to the receiver on the wireless channel, wherein the further transmission is related to transmission of the data, wherein the further transmission in the CoTS interval of a CoTS message confirming that the transmitter received a clear-to-send (CTS) message from the receiver and carrying a list of wireless channels on which the transmitter will be transmitting to the receiver,
(iii) if the determination is affirmative, then continuing to avoid transmission on the wireless channel for a second avoidance period, wherein the second avoidance period includes, in sequence beginning at an end of the first avoidance period, (a) a third interframe interval, (b) a data transmission interval, (c) a fourth interframe interval, and (d) an ACK interval, but
(iv) if the determination is negative, then discontinuing the avoiding of transmission on the wireless channel rather than continuing to avoid transmission on the wireless channel for the second avoidance period.

6. The device of claim 5, wherein the RTS message is a first RTS message, the data is first data, the CoTS message is a first CoTS message, and the CTS is a first CTS message, and wherein the operations further comprise:
when the device has second data to transmit to a recipient device on the wireless channel, (a) verifying absence of communication on the wireless channel for a fifth interframe interval, (b) upon expiration of the fifth interframe interval, transmitting on the wireless channel to the recipient device a second RTS message for the second data to be transmitted, (c) after transmitting the second RTS message, receiving on the wireless channel from the recipient device a second CTS message corresponding with the second RTS message, and (d) responsive to receiving from the recipient device the CTS message, transmitting on the wireless channel a second CoTS message before then transmitting to the recipient device on the wireless channel the second data.

* * * * *